No. 869,668. PATENTED OCT. 29, 1907.
C. B. THWING.
PYROMETER.
APPLICATION FILED JAN. 25, 1907.
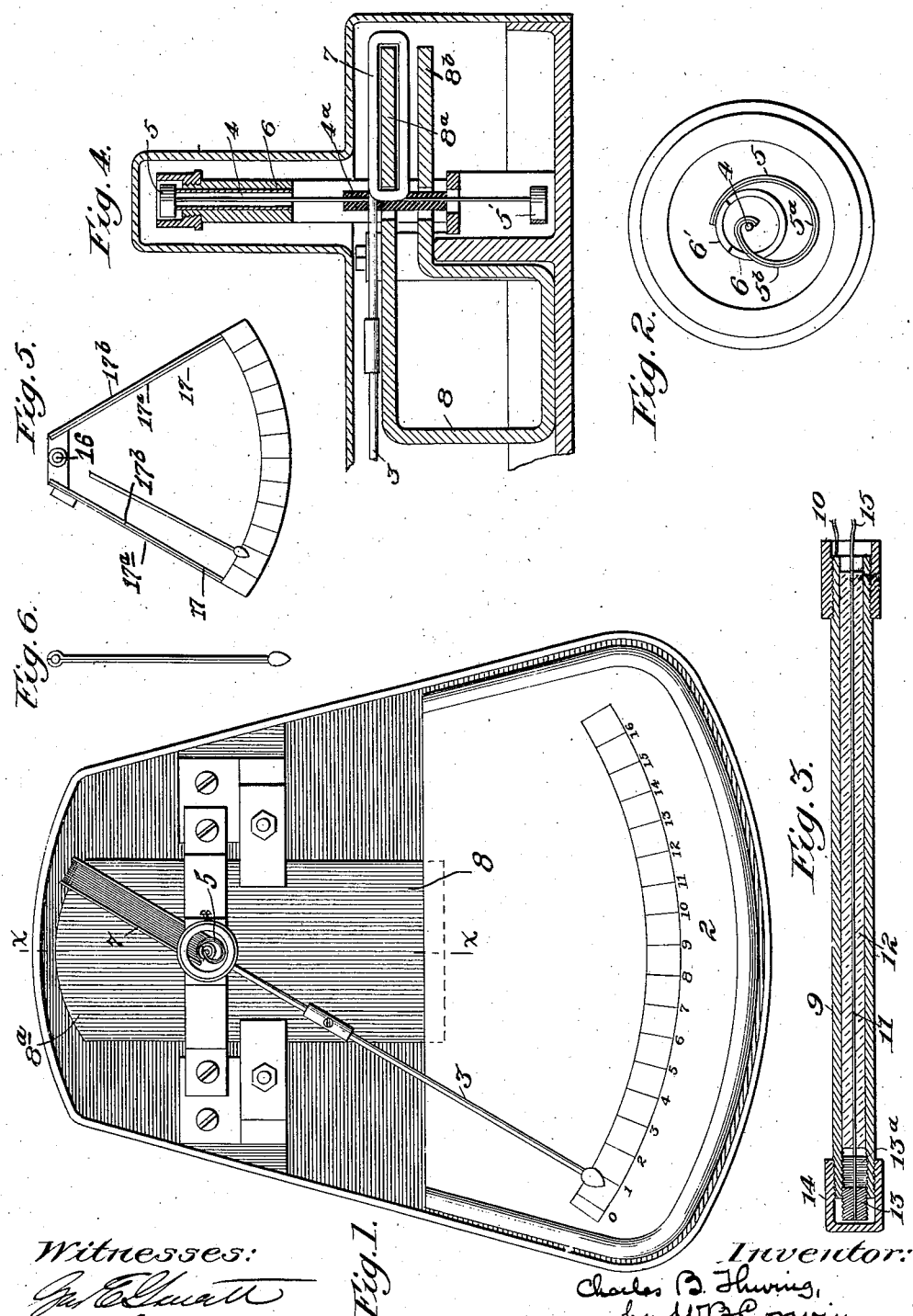
Witnesses: Inventor:
Charles B. Thwing,
by W. B. Corwin,
Att'y.

UNITED STATES PATENT OFFICE.

CHARLES B. THWING, OF PHILADELPHIA, PENNSYLVANIA.

PYROMETER.

No. 869,668.  Specification of Letters Patent.  Patented Oct. 29, 1907.

Application filed January 25, 1907. Serial No. 354,032.

*To all whom it may concern:*

Be it known that I, CHARLES B. THWING, a citizen of the United States, residing at Philadelphia, Philadelphia county, Pennsylvania, have invented a new and useful Improvement in Pyrometers, of which the following is a specification.

My invention relates to that class of pyrometers in which a thermo-electric couple is employed to generate the electric current to operate the instrument.

In the ordinary form of thermo-electric pyrometer, the pointer or indicator is adjusted to stand at a certain fixed point on the scale when the thermo-electric couple is idle and no current is passing through the instrument, regardless of the temperature surrounding it. Consequently, should the pyrometer be adjusted say in a temperature of 60° F. and subsequently be used in a temperature of 100° F., the instrument, instead of registering accurately the temperature to which the heated end of the thermocouple is exposed, would be faulty; or in other words, the current generated in the couple would not deflect the pointer sufficiently to carry it far enough on the scale to indicate the correct temperature.

My invention has for its principal object to obviate such defect, and to produce a pyrometer which will always indicate on its scale the temperature of the atmosphere surrounding the same when current is not passing through the instrument.

In the drawing, in which like symbols indicate like parts Figure 1 is a top plan view of my improved pyrometer with the casing removed. Fig. 2 is an enlarged top plan view of the bearing for the pointer and coil. Fig. 3 is a longitudinal section of my improved thermoelectric couple. Fig. 4 is a vertical section on the line $x$—$x$ of Fig. 1. Figs. 5 and 6 are views of modifications.

Referring to the drawing:—2 represents the calibrated scale for indicating temperatures, and 3 the pointer of the instrument, suspended by the wire 4. The wire 4 is rigidly attached at its upper end to one end of a helical spring bearing 5, the other end of said bearing being fixedly connected to an extension 6′ of a sleeve 6, through which the wire 4 extends downwardly to the sleeve 4ª of the pointer. The spring bearing 5 is constructed of strips or ribbons of materials having relatively different coefficients of expansion (preferably of brass and iron), rigidly fastened together throughout their length to form a single compound strip, the inner strip 5ª being of brass and the outer one, 5ᵇ, of iron.

7 is the coil and 8 is the magnet of the electrical mechanism for operating the pyrometer, the said coil being adapted to vibrate with one side in the air gap between the legs 8ª and 8ᵇ of the magnet.

The wire 4 is preferably connected at its lower end to a spring bearing 5′, similar in construction and function to the top spring bearing 5.

In Fig. 3, I show the improved thermo-couple which I prefer to employ in connection with my improved pyrometer. In this figure, 9 is a section of iron tubing to which one of the wires 10 of the electric circuit of the pyrometer is connected. 11 is a wire of a different metal forming the other element of the thermo-electric couple and extending through suitable insulating material, or insulating sleeves, 12 in the pipe 9. 13 is a nut having split ends 13ª between which the end of the wire 11 is placed, and which, when the nut is screwed to place in the end of the pipe will be forced towards each other and firmly grip the wire. 14 is a protective cap adapted to be screwed on the end of the pipe over the nut 13. The wire 11 is connected to the other wire 15 of the electric circuit of the pyrometer. When the end of the couple containing the nut 13 is heated to a temperature above that to which the end to which the wires 10 and 15 are attached is exposed, current will be generated the amount of current so generated depending upon the disparity of temperature between the two ends. Nickel or a refractory alloy may be substituted for the iron tube. The tube formed of iron or other refractory metal or alloy in addition to its function as one member of the thermo-electric couple also serves as a protector to the wire which is made of a less refractory metal.

The operation of my improved pyrometer is as follows:—The pointer of the instrument and its bearings are so adjusted as to indicate on the scale 2 the temperature of the atmosphere at the place of adjustment. Any increase of temperature of the atmosphere at the point of use above that at the place of adjustment will expand the metals of the helical bearings 5 and 5′, but the brass strips 5ª, having a greater expansion than the iron strips 5ᵇ, will cause the bearing to uncoil to a certain extent and swing the pointer to the left to a position on the scale indicating the temperature of the atmosphere then prevailing. The pyrometer being thus always accurate as to the temperature of the atmosphere surrounding it, and the cooler end of the thermoelectric couple being at substantially such temperature when the instrument is in use, the swing of the pointer caused by the current generated by the couple and flowing through the coil will carry it to a point on the scale which will always accurately indicate the temperature prevailing around the hotter end of the couple.

In Fig. 5 I show a modification of my invention, in which the scale 2, instead of being stationary, is pivoted at the point 16, and has attached to it one end of one or more thermo-bars 17, composed of a brass strip 17ª on one side and an iron strip 17ᵇ on the other, the other end of said bar being connected to a fixed point of the casing of the instrument. The pointer in this form will not be provided with a thermo-bearing as in Figs. 1 and 2, but will have an ordinary helical spring or other form of bearing. In this modified form of device, upon any increase of temperature above that to which the instrument is adjusted, the brass expanding to a greater extent than the iron will cause the scale 2 to move on its pivot to the right and consequently the pointer will indicate on the scale a higher temperature.

In Fig. 6 I show still another modification to be used with a stationary scale and a pointer having any ordinary form of bearing. In this modified form the pointer is constructed of two materials of unequal expansion and so placed relatively to each other that upon any increase of temperature above or below the temperature to which the instrument has been adjusted, the pointer will be bent in a horizontal plane to indicate on the scale the amount of such increase.

While the constructions shown in Figs. 4 and 5 and others may be employed, if desired, I prefer that shown in Figs. 1 and 2.

The advantages of my invention are that it is simple in construction, very compact, not liable to get out of order, and exceedingly accurate in operation.

Modifications may be made in the form, construction, and arrangement of the various parts, and other metals or materials may be substituted for those described which will accomplish the results I accomplish without departing from the spirit of the invention or sacrificing any of its advantages.

I claim:—

1. In a pyrometer, a scale member, an indicating member, electrically operated mechanism for actuating the indicating member, and automatic means responding to changes in temperature for moving one of said members relatively to the other so as to cause the indicating member to indicate on the scale member the temperature substantially of the surrounding atmosphere when no current is passing through the instrument.

2. In a pyrometer, a scale, an indicator therefor, electrically operated mechanism for actuating the indicator, and bearings for the indicator responding to changes in temperature so as to cause the indicator to indicate the temperature of the surrounding atmosphere when no current is passing through the pyrometer.

3. In a pyrometer, a scale, an indicator therefor, electrically operated mechanism for actuating the indicator, and a coiled bearing for the indicator constructed of materials having different coefficients of expansion which will cause the indicator to indicate the temperature of the surrounding atmosphere when current is not passing through the pyrometer.

4. In a thermo-electric pyrometer, indicating mechanism, and a current-generating member consisting of a tubular member composed of a refractory metal, forming one element of the thermo-electric couple, a wire composed of a dissimilar metal from the tubular member, passing through the pipe and forming the other element of said couple, a split screw plug screwing into the lower end of said tubular member and gripping the lower end of said wire, and circuit wires connected to the pyrometer and to said wire and said tubular member at their upper ends.

In testimony whereof, I have hereunto set my hand.

CHARLES B. THWING.

Witnesses:
A. B. AMES,
B. K. MORTON.